United States Patent [19]
Biggs et al.

[11] Patent Number: 5,673,080
[45] Date of Patent: Sep. 30, 1997

[54] SEAMLESS MULTIMEDIA CONFERENCING SYSTEM USING ENHANCED ENDPOINT DEVICES

[75] Inventors: John T. Biggs, Ocean County; Diane G. Landante, East Brunswick; Sandra C. Milstead, Clarksburg; Dale L. Skran, Marlboro; Arthur R. Snowdon, Tinton Falls, all of N.J.

[73] Assignee: Lucent Technologies Inc., Murray Hill, N.J.

[21] Appl. No.: 729,197

[22] Filed: Oct. 15, 1996

Related U.S. Application Data

[63] Continuation of Ser. No. 272,350, Jul. 8, 1994, abandoned.
[51] Int. Cl.$^6$ .............................. H04N 7/15; H04M 11/00
[52] U.S. Cl. ............................................. 348/15; 379/202
[58] Field of Search .................... 348/15, 16, 14, 348/17, 18, 19; 379/201, 202, 93, 94, 96

[56] References Cited

U.S. PATENT DOCUMENTS

| | | | |
|---|---|---|---|
| 4,653,090 | 3/1987 | Hayden | 379/204 |
| 4,953,159 | 8/1990 | Hayden et al. | 370/62 |
| 5,003,532 | 3/1991 | Ashida et al. | 348/15 |
| 5,061,492 | 10/1991 | Ueno | 348/15 |
| 5,136,581 | 8/1992 | Muehrcke | 348/15 |
| 5,323,445 | 6/1994 | Nakatsuka | 348/15 |
| 5,369,694 | 11/1994 | Bales et al. | 379/202 |

OTHER PUBLICATIONS

Bellcore Generic Requirements, GR-1337-CORE, Issue 1, Sep. 1993.
ITU Document H.231 "Multipoint Control Units for Audiovisual Systems Using Digital Channels Up to 2 Mbps", Mar. 1993.
ITU Document H.243 "Procedures for Establishing Communication Between Three or More Audiovisual Terminals Using digital Channels Up to 2 Mbps," Mar. 1993.

*Primary Examiner*—Stella Woo
*Attorney, Agent, or Firm*—Steven R. Bartholomew

[57] ABSTRACT

Methods of establishing multimedia conferences between a multimedia server and a plurality of endpoint devices. One or more of these endpoint devices are enhanced in that they include a memory adapted to store one or more telephone numbers, each telephone number corresponding to a respective endpoint device, and a user interface coupled to the memory for selecting a telephone number stored in the memory. The methods are performed in a substantially continuous manner, signifying that a third endpoint device is added to a preexisting conference between a first and a second endpoint device without substantially interrupting this preexisting conference. Therefore, a seamless multimedia conference is provided between the first and second enhanced endpoint devices even when a third endpoint device is added to the conference.

6 Claims, 8 Drawing Sheets

| ENDPOINT DEVICE IDENTIFIER | TELEPHONE NUMBER OR NETWORK ADDRESS FOR ENDPOINT DEVICE (POINT-TO-POINT LINK) | TELEPHONE NUMBER OR NETWORK ADDRESS FOR MULTIMEDIA CONFERENCE (MEET ME #) |
|---|---|---|
| FIRST ENDPOINT DEVICE | | |
| SECOND ENDPOINT DEVICE | | |
| THIRD ENDPOINT DEVICE | | |

20 CHARACTER STRING FOR THE NETWORK ADDRESS (TELEPHONE NUMBER)

FIG. 8

SEAMLESS MULTIMEDIA CONFERENCING SYSTEM USING ENHANCED ENDPOINT DEVICES

This is a continuation of application Ser. No. 08/272,350 filed Jul. 8, 1994, now abandoned.

BACKGROUND OF THE INVENTION

1. Field of the Invention

The present communications system relates in general to multimedia (audio, video, and/or data) conferencing techniques, and in particular to a multimedia bridging system which utilizes improved endpoint devices to provide a variety of features in a manner that constitutes a considerable improvement over the current art.

2. Description of the Prior Art

In the field of multimedia communications, a "bridge" or "multipoint control unit" (MCU) is a computer-controlled device which includes a multiplicity of communication ports which may be selectively interconnected in a variety of ways to provide communication among a group of endpoint devices. MCUs are often used to establish multi-party conference calls. The state-of-the-art MCU is described in ITU Document H.243, "Procedures for Establishing Communication Between Three or More Audiovisual Terminals Using Digital Channels up to 2 Mbps," March 1993, and in ITU Document H.231, "Multipoint Control Units for Audiovisual Systems Using Digital Channels up to 2 Mbps," March 1993.

Generally speaking, such systems require conferences to be prearranged in advance. A series of steps must be performed in order to provide the system topology necessary to implement a multimedia conference call. Typically, the user calls a reservation agent who then directs the MCU to either prepare itself to receive calls at a given time, or to dial out to the user at a given time. These setup procedures are inconvenient, tedious, and inflexible. A clear need exists to provide for "spontaneous" or "on-demand" conferencing where the user does not need to invoke a reservation system to set up a multimedia conference.

Bellcore Generic Requirements GR-1337-CORE, Issue 1, September 1993 contains a description of a "spontaneous" conferencing system based on user control from a touch-tone (DTMF) keypad, i.e., with strings of numbers and letters, and audio feedback from stored announcements. This method is widely used in the audio bridging industry for voice calls, and in the Bellcore GR-1337-CORE proposal, the same method is applied to multimedia calls (voice/video).

The method of spontaneous conferencing widely used for audio-only calls, and applied to multimedia calls in GR-1337-CORE, suffers from the following difficulties that represent areas of possible improvement:

1. The strings of numbers require a long period of time to enter. 2. The codes required to perform operations are numerous and difficult to remember. 3. Feedback is limited to audio messages, and the length of these messages is frequently such that the process of conference setup is very slow. 4. The user must make an initial decision to contact the MCU for the purpose of establishing a conference. 5. The MCU contacted via the method of GR-1337-CORE may have no available resources with which to implement a multimedia conference. 6. The user is highly aware of the "seams" (i.e., procedural discontinuities) in the process of constructing the conference. 7. The person initiating the addition of a new party to the conference may wish to have a private conversation with the new party prior to allowing this party into the conference. The purpose of this conference might be to confirm the identity of this new party while allowing the conference to continue. However, existing systems are not equipped to provide such a private conferencing mode. 8. The person initiating the conference might wish to select the conference mode of operation which, for example, determines the selection criteria to be applied in determining the party or parties which will be broadcast to other conference participants at any given moment in time. Typical conference modes include chair mode voice-activated mode, and various other modes known to those skilled in the art. It would be desirable to change this mode during the conference upon command, although such changes are difficult or impossible to implement with state-of-the-art systems.

U.S. Pat. No. 4,653,090, which is owned by the current applicant, describes a system of graphics-based call management which establishes a voice and/or data conference using a graphics user interface. U.S. Pat. No. 4,953,159 (also owned by the current applicant) describes an audio graphics conferencing arrangement controlled by a graphics user interface. In both of the aforementioned patents, graphics-based call management is limited to voice and data calls, and is not applied to video calls.

SUMMARY OF THE INVENTION

Techniques are disclosed for controlling the communication of multimedia electronic signals representing audio, video, and/or data. These techniques operate in conjunction with a system including an existing network, an existing multimedia server (MMS) connected to the network, and a reservation system for scheduling the operation of the MMS. A plurality of endpoint devices constructed in accordance with any of the techniques disclosed herein are connected to the network. The endpoint devices are adapted for converting multimedia electronic signals into audio, video, and/or data. The network is comprised of communications links and switches adapted for selectively connecting and disconnecting the communications links. The MMS is equipped to utilize the network such that multimedia signals may be exchanged among a plurality of endpoint devices, thereby providing a multimedia conference. The reservation system includes a data storage device for storing scheduling information associating endpoint devices with conference initiation times, a processor for accessing the data storage device, and a user interface device for inputting information specifying particular endpoint devices and conference initiating times. The reservation system is coupled to the MMS and to the network via an MMS communications interface and a network communications interface, respectively. The network assigns the MMS a network address uniquely specifying a particular MMS.

According to the techniques disclosed herein, at least one of the endpoint devices is equipped with an endpoint communications link establishment device, an endpoint data transceiver, an endpoint processor, and endpoint memory. The network address and/or telephone number of at least one reservation system is loaded into endpoint memory.

Several novel methods are disclosed for implementing a multimedia conference. In connection with a first embodiment, a conference is initiated when the communications link establishment device of a first endpoint device establishes a point-to-point communications link with a second endpoint device over the network. Next, the user of the first or second endpoint device selects an option of setting up a multipoint, multimedia conference by entering a request into the user interface device of the respective endpoint device. The request is forwarded to the first endpoint device endpoint processor which commands the first endpoint device communications link establishment device to establish a communications link with the reservation system. The first endpoint device endpoint processor then issues an information request to the reservation system for a first and second network address and a conference identification number uniquely specifying a given multimedia conference, while the first endpoint device supplies a third network address corresponding to a third party, to the reservation system. The reservation system relays this information request to the MMS. The MMS provides the reservation system with the conference identification number and the first and second network addresses, and establishes a three-party conference linking three endpoint devices, wherein two endpoint devices dial into the conference while the third endpoint is added by-the MMS via dial-out. The conference identification number and network addresses (and/or telephone numbers) are downloaded from the reservation system processor into the first endpoint device endpoint processor. The conference identification number and the first network address (and/or telephone number) is stored in endpoint memory, and the second network address and the conference identification number are downloaded to the second endpoint device endpoint processor. The point-to-point communications link between the first and second endpoint devices is disconnected. The first and second endpoint device endpoint communications link establishment devices each establish a communications link with the MMS at the network address (and/or telephone number) downloaded into respective endpoint device memories. As previously instructed by the reservation system, MMS establishes a communications link with the third endpoint device, thereby establishing a multipoint, multimedia conference.

Multimedia conferences established according to various preferred embodiments disclosed herein are perceived by endpoint device users to be procedurally continuous, such that, once a communications link is established with a given endpoint device, this communications link is perceived to be substantially continuous until such time as the multimedia conference has been fully implemented. In this manner, multimedia conferences are provided which are substantially procedurally continuous as perceived by system users.

DETAILED DESCRIPTION

Figure 1:
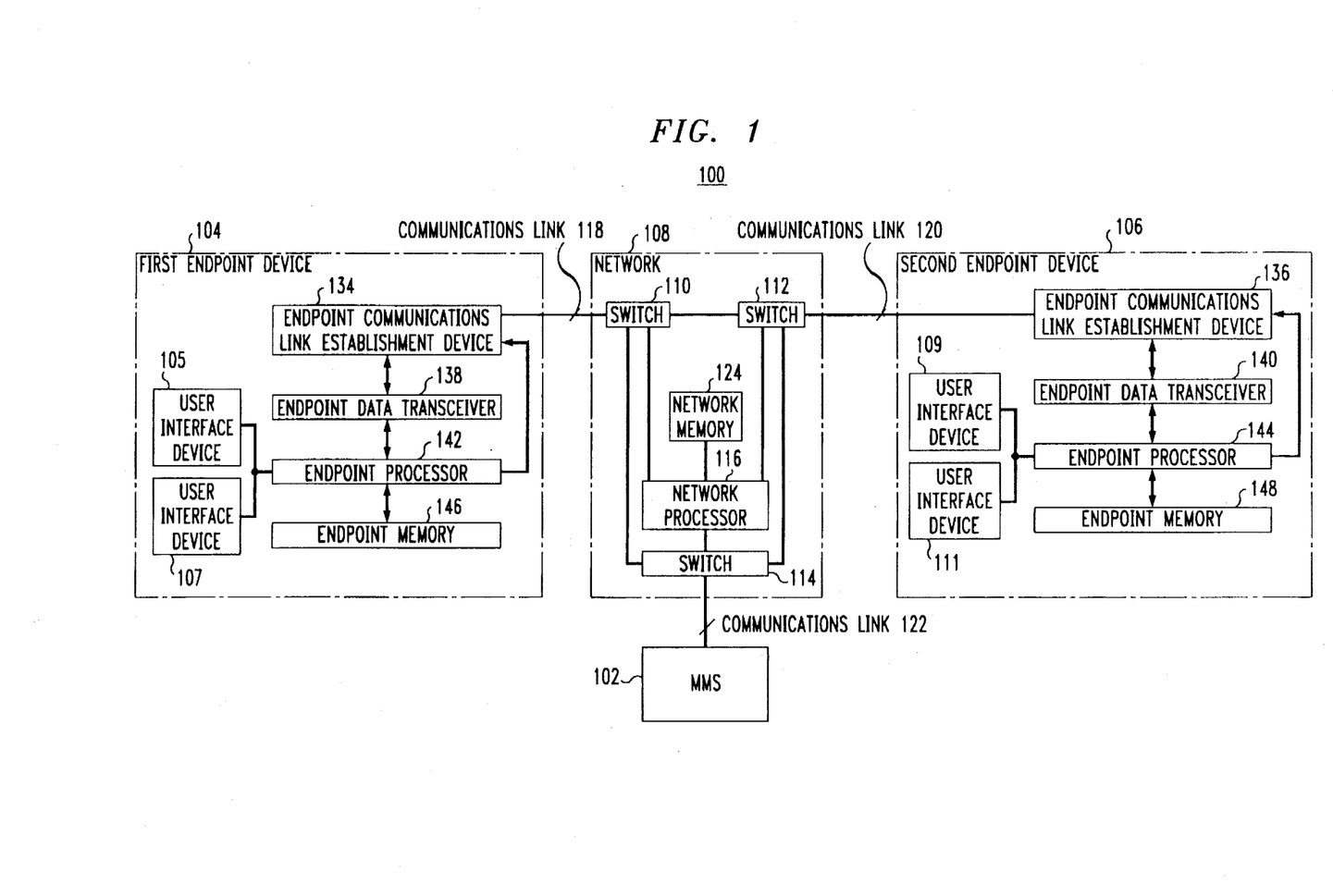
FIG. 1 is a block diagram setting forth the system architecture of a multimedia conferencing system which includes an MMS, a plurality of endpoint devices, and a communications network.

FIG. 1 is a block diagram setting forth the system architecture of a multimedia conferencing system 100 which includes an MMS 102, a plurality of endpoint devices 104, 106, and a network 108. Network 108 includes a plurality of switches 110, 112, 116 connected to a plurality of communications links 118, 120, 122, so as to provide selective interconnection of the communications links. Switches 110, 112, 114 are controlled by a network processor 116 coupled to network memory 124. Communications links 118, 120, 122 may be any known device or devices capable of transporting multimedia electronic signals from one location to another. Multimedia electronic signals are signals which represent data, video, and/or audio information. Examples of communications links 118, 120, 122 include conventional telephonic links, ISDN links, Ethernet connections, Asynchronous Transfer Mode (ATM) links, or the like. Network memory 124 may be any combination of read-only memory (ROM) and random-access memory (RAM). Suitable devices for use as network memory 124 are known to those skilled in the art. Network processor 116 may be a microprocessor of a type known to those skilled in the art. Switches 110, 112, and 114 are adapted for use in conjunction with the specific type or types of communications links 118, 120, 122 employed in the multimedia conferencing system 100. The selection of suitable devices for switches 110, 112, and 114 is a matter well-known to those skilled in the art.

Multimedia server (MMS) 102 provides for the communication of multimedia information among a plurality of endpoint devices 104, 106. The MMS 102 is connected to a plurality of endpoint devices 104, 106 via network 108 over communications link 122. Communications link 122 could be a plurality of standard wire-pair telephonic links.

The devices disclosed in standards ITU-T H.231 and ITU-T H.243 MCU (multipoint control unit) are examples of suitable devices for use as MMS 102. However, other suitable devices for MMS 102 may be based on an existing protocol different from that utilized by the ITU-T H.243 and/or ITU-T H.231 MCU. For example, an MMS 102 may operate in such a manner that electronic signals representing each medium (i.e., video, audio, and data) are separated into their own virtual circuit comprising a media stream, such that a first media stream carries electronic signals representing video information, a second media stream carries electronic signals representing audio information, and a third media stream carries electronic signals representing data. Alternatively, MMS 102 may operate by multiplexing all media streams together into a single media stream. It is also possible to combine the two aforementioned media stream approaches, for example, by providing a data/control media stream separate from an audio/video media stream wherein video and audio signals are multiplexed together on a first media stream and data and control signals are multiplexed together on a second media stream.

As stated above, MMS 102 may be implemented using an MCU. An MCU (multipoint control unit) may be defined as a device which supports the bridging of the ITU-T suite of multimedia protocols, according to H.231, H.243. An MCU is considered to be a specific category of MMS.

A multimedia protocol is any protocol which allows the multiplexing of audio, video, and data together into a single stream adapted for transmission over a communications link. A multimedia protocol may alternatively separate video, audio, and data into three or more streams, where respective streams are accompanied by corresponding control messages. For some protocols, digital encoding techniques are used, while for others analog techniques such as FDM are used. Typically, one or more codings are specified for audio, video, aid/or data. The ITU-T H.320 protocol is an example of a standard multimedia protocol. Intel PCS (Personal Conferencing System) is another example, this time of a non-standard protocol. The procedures of this invention apply without regard to the specific multimedia protocol being used.

First endpoint device 104 and second endpoint device 106 are coupled to MMS 102 via network 108. These endpoint devices 104, 106 include one or more user interface devices 105, 107, 109, 111. Each user interface device 105, 107, 109, 111 includes either an input means, an output means, or an input means combined with an output means. Output means are adapted to convert multimedia electronic signals representing audio, video, or data into actual audio, video, or data. Input means are adapted to accept audio, video, and data inputs, and to convert these inputs into electronic signals representing audio, video, or data. Examples of user interface devices 105, 107, 109, 111 include video displays, keyboards, microphones, speakers, video cameras, touch-tone keypads, or the like.

Endpoint devices 104, 106 are adapted to communicate using any of a number of existing multimedia communication protocols known to those skilled in the art. The endpoint device multimedia communication protocol controls the presentation of media streams (electronic signals representing audio, video, and/or data information) to the endpoint device user. Endpoint devices 104, 106 may function bidirectionally, both sending and receiving multimedia information, or, alternatively, endpoint devices may function unidirectionally, receiving but not sending multimedia information, or sending but not receiving multimedia information. Similarly, in a given multimedia system, some endpoint devices may be equipped to operate bidirectionally whereas other endpoint devices may be equipped to operate unidirectionally.

An example of a suitable endpoint device is an H.320 audiovisual terminal, but any device capable of terminating a multimedia stream and presenting it to the user constitutes an endpoint device for the purposes of this patent. A particular product example of H.320 endpoint is the AT&T GIS Vistium. If the endpoint device is a "plain old telephone set" rather than a computer controlled general-purpose device, it cannot by its very nature participate fully in a multimedia conference. However, such an endpoint device could be used to generate electronic signals representing control information, i.e., a control stream, to an MMS via the use of DTMF signals. However, any conference setup and control using such a technology cannot, by its nature, be "seamless". Also, the termination of such signals by the MMS requires MMS enhancements Endpoint devices 104, 106 may utilize various existing signalling techniques and multimedia communication protocols for the purpose of communicating with other system components, such as other endpoint devices 104, 106, MMS 102 and/or network 108. Examples of such signalling techniques and multimedia communication protocols include BAS, (AIM, AIA), MBE, NS-com, or the like. Definitions for these protocols and signalling schemes are as follows.

AIA

This is a Bit Rate Allocation Signal (BAS) code that is sent by an endpoint device conforming to the ITU-T H.243 MCU or the ITU-T H.320-recommendation for the purpose of indicating that audio is active as opposed to muted. This BAS code is defined in ITU-T recommendation H.230.

AIM

This is a Bit Rate Allocation Signal (BAS) code that is sent by an endpoint device conforming to the ITU-T H.243 MCU or the ITU-T H.320-recommendation for the purpose of indicating that audio is muted. This BAS code is defined in ITU-T recommendation H.230.

BAS code

BAS (Bit Rate Allocation Signals) codes are control messages defined in the ITU-T H.221 recommendation and additionally defined in ITU-T H.230. Such codes are used to control the multimedia multiplex allocation for an ITU-T H.320-conformant endpoint, and to indicate status, such as whether the audio is muted(see AIM/AIA).

BAS DTMF

In the ITU-T H.230 standard, a method is described for encoding numbers into "BAS" (Bit rate Allocation Signals). This method may be used to encode touch-tone key-presses instead of the existing DTMF method of sending sinusoidal tones through a conventional voice channel. Since DTMF in the voice channel is disruptive to the conference and is not very reliable, the "BAS DTMF" is the preferred method of simulating DTMF features on ITU-T H.320 equipment, such as ITU-T H.320-compatible endpoint device and/or MMS. This general approach could be used (although different in detail) with any multimedia protocol.

MBE

The Multi-Byte Extension (MBE) is a message type defined in the ITU-T H.221 standard to allow longer length messages than single BAS codes to be sent. The message can be up to 256 bytes in length. A preferred embodiment of the invention utilizes an improved MBE data structure, to be described hereinafter.

NS-command

Sometimes written NS-com, a Non-Standard Command is an multi-byte ITU-T H.320 control message defined in ITU-T recommendation H.221. The message contains a country code and manufacturer's id, allowing each manufacturer to add their own, non-standard messages.

According to a preferred embodiment disclosed herein, a new type of MBE (MultiBit Extension) message is used to send data representing the digits of one or more telephone numbers corresponding to endpoint devices to be added to a multimedia conference. The data structure for this "MBE NIA (Network Indicate Address) message," is: {start-MBE/ N/<nia>/n/dn,d(n−1)/. . ./d2,d1/} where

N=number of bytes in the message <nia>=MBE_NIA n=number of channel (1 to XX) that the address is for d1=first digit to be dialed coded as a 4 bit binary number d2=second digit to be dialed, etc.

d(n−1)=second to last digit to be dialed dn=last digit to be dialed

There are N−2 groupings of packed digits (subtract 2 bytes for <nia> and n). If <dn,d(n−1)> equals 0x1F, it is assumed that the NIA of the nth channel is the same as that of the (n−1)th channel.

In general, NIAs are sent with the least significant digit first, and it is not required to send the complete NIA. If a partial NIA is received, these digits will replace the least significant digits of the (n−1)th channel in forming the network address for the nth channel. This allows much time to be saved if all the NIAs differ by one or two digits.

All other communication (e.g., status messages, privacy indication, etc.) between the endpoint and MMS can be accomplished by using a message structure termed "NS-Com" in ITU-T parlance.

The structure for an NS-Com (Non-standard Command) message is: {NS-comm/N/country code/manufacturer code/command}
where N=number of bytes in the message country code=country manufacturer code=manufacturer command=type of message (Privacy_on, Drop Party, Busy, etc.).

The term "mode" may be applied in the context of multiplexing multimedia signals on a communications link. In this context, "mode" refers to the combination of coding techniques used to encode/decode the media information and, if the coding technique is a frame-based one, the particular bit rate allocations being used. For example, in ITU-T H.320, a typical mode might include ITU-T G.711 audio, ITU-T H.261 video, and ITU-T 6.4 kbs low-speed data as described in ITU-T H.221.

Returning now to FIG. 1, the illustrative hardware embodiments set forth for the first and second endpoint devices 104, 106, respectively, will be described further. Each endpoint device 104, 106 includes an endpoint communications establishment device 134, 136, respectively, adapted for connection to a communications link 118, 120. The endpoint communications establishment devices 134, 136 may include one or more of the following devices: (a) conventional telephone line dial-out devices, (b) a local area network interface, or (c) various other types of multimedia hardware. The structure and operation of the aforementioned devices is a matter within the knowledge of those skilled in the art. Communications links 118, 120 may be copper wire pairs, fiber optic cable, ISDN lines, co-axial cables, or the like.

Endpoint communications establishment devices 134, 136 are coupled to respective endpoint data transceivers 138, 140 equipped to send and receive electronic signals representing data. The combination of endpoint communications establishment device 134 and endpoint data transceiver 138 may be implemented using any of a number of existing network interface devices of a type known to those skilled in the art. Similarly, the combination of endpoint communications link establishment device 136 and endpoint data transceiver 140 may be implemented using a modem.

Endpoint communications link establishment device 134 and endpoint data transceiver 138 are controlled by endpoint processor 142. Endpoint communications link establishment device 136 and endpoint data transceiver 140 are controlled by endpoint processor 144. Endpoint processors 142, 144 may be microprocessors of a type known to those skilled in the art. Processor 142 is coupled to endpoint memory 146 and processor 144 is coupled to endpoint memory 148. Endpoint memories 146 and 148 may be any combination of conventional RAM and ROM devices, the selection of which is a matter well-known to those skilled in the art.

The multimedia conferencing techniques disclosed herein provide for controlling the communication of multimedia electronic signals representing audio, video, and/or data. These techniques are operable in conjunction with the system shown in FIG. 1 and including network 108, multimedia server (MMS) 102 connected to network 108, and the plurality of endpoint devices 104, 106 connected to network 108. The network 108 is comprised of communications links 118, 120, 122 and switches 110, 112, 114 adapted for connecting and disconnecting the communications links 118, 120, 122. The endpoint devices 104, 106 are adapted for converting multimedia electronic signals into audio, video, and/or data. MMS 102 is equipped to utilize network 108 such that multimedia signals may be exchanged among a plurality of endpoint devices 104, 106, thereby providing a multimedia conference.

To summarize the techniques discussed in conjunction with FIG. 1, at least one of the endpoint devices 104 includes an endpoint communications link establishment device 136, an endpoint data transceiver 140, an endpoint processor 144, endpoint memory 148, and one or more user interface devices 105, 107. The MMS 102 is an existing MMS of a type well-known to those skilled in the art, such as an MCU.

Several novel methods are disclosed for implementing a multimedia conference. The network 108 assigns the MMS 102 a network address uniquely specifying a particular MMS 102. For each endpoint device, one or more network addresses are loaded into endpoint memory 146, 148. Each of the network addresses loaded into endpoint memory 146, 148 corresponds to a specific MMS 102.

Techniques are disclosed for controlling the communication of multimedia electronic signals representing audio, video, and/or data. These techniques operate in conjunction with a system including an existing network, an existing multimedia server (MMS) connected to the network, and a reservation system for scheduling the operation of the MMS. A plurality of endpoint devices constructed in accordance with any of the techniques disclosed herein are connected to the network.. The endpoint devices are adapted for converting multimedia electronic signals into audio, video, and/or data. The network is comprised of communications links and switches adapted for selectively connecting and disconnecting the communications links. The MMS is equipped to control the network such that multimedia signals may be exchanged among a plurality of endpoint devices, thereby providing a multimedia conference. The reservation system includes a data storage device for storing scheduling information associating endpoint devices with conference initiation times, a processor for accessing the data storage device, and a user interface device for inputting information specifying particular endpoint devices and conference initiating times. The reservation system is coupled to the MMS and to the network via an MMS communications interface and a network communications interface, respectively. The network assigns the MMS a network address uniquely specifying a particular MMS.

According to the techniques disclosed herein, at least one of the endpoint devices is equipped with an endpoint communications link establishment device, an endpoint data transceiver, an endpoint processor, and endpoint memory. The network address and/or telephone number of at least one reservation system is loaded into endpoint memory.

According to the embodiments described herein, a multimedia conference may be implemented spontaneously, or from a point-to-point multimedia call, in a "seamless" manner, such that procedural discontinuities perceived by conference participants are minimized or eliminated providing all participants are using the endpoints described herein. If only the initiating endpoint is enhanced, non-enhanced endpoints will be included in the conference, but only the enhanced endpoint will perceive a seamless multimedia call. The "seamless" multimedia conferencing techniques disclosed herein have the following characteristics, which are applicable, for example, in the context of a transition from a point-to-point conference call (two-party) to a multipoint conference call (more than two parties).

Characteristics of "Seamless" Multimedia Conferencing

1. The users of endpoint devices in a point-to-point conference call do not perceive the dropping of a point-to-point connection between them, nor do users perceive the creation of a new multipoint connection to the MMS, although both users are aware that a multipoint conference call is being initiated. 2. The user of the endpoint device adding a third party to a conference is not explicitly aware of processes implemented by the MMS during the transition, nor is the user required to take special action at the time of the transition to enter numbers needed to reach the MMS, or otherwise interact directly with the MMS. All such interactions are automated by the conferencing system, and are hidden from the user during the transitional period between a point-to-point conference call and a multipoint conference call. Accordingly, one or more MMS network addresses should be installed on each endpoint device as a one-time activity, for example, during installation of the enhanced software and hardware on the endpoint device. 3. The user of the endpoint device adding a third party is not aware of any contact with a reservation system, nor of any interactions with such a reservation system. (These reservation systems are commonly utilized in various prior-art conferencing devices which are well-known to those skilled in the art.) 4. In the event that more than one MMS is contacted while setting up a conference, this signifies that the initial MMS contacted was unable to complete the multipoint conference call, due to insufficient capacity, attributable, for example, to the number of circuits in the MMS 102. However, even though the initial unit lacks capacity to support the multipoint conference, the user is not aware of the involvement of more than one MMS in the operation.

To increase ease of use, the seamless conferencing system employs in-band signalling between endpoint devices 104, 106 through network 108. However, the in-band signaling capabilities of the multimedia protocol are extended beyond that of prior-art schemes to provide additional messages.

In accordance with a preferred embodiment disclosed herein, one or more endpoint devices 104, 106 are enhanced as follows: Software is loaded into endpoint device memory 146, 148, respectively, which allows the first endpoint 104 to inform the second endpoint 106 of the MMS 102 network addresses while presenting a seamless interface to the user. Software is loaded into endpoint device 106 which equips endpoint device 106 to accept network addresses for an MMS 102, drop a point-to-point connection between the second endpoint devices 106 and 104, and then connect to a multipoint MMS 102 conference without providing apparent disruption to the user of the endpoint device 106.

Figure 2:
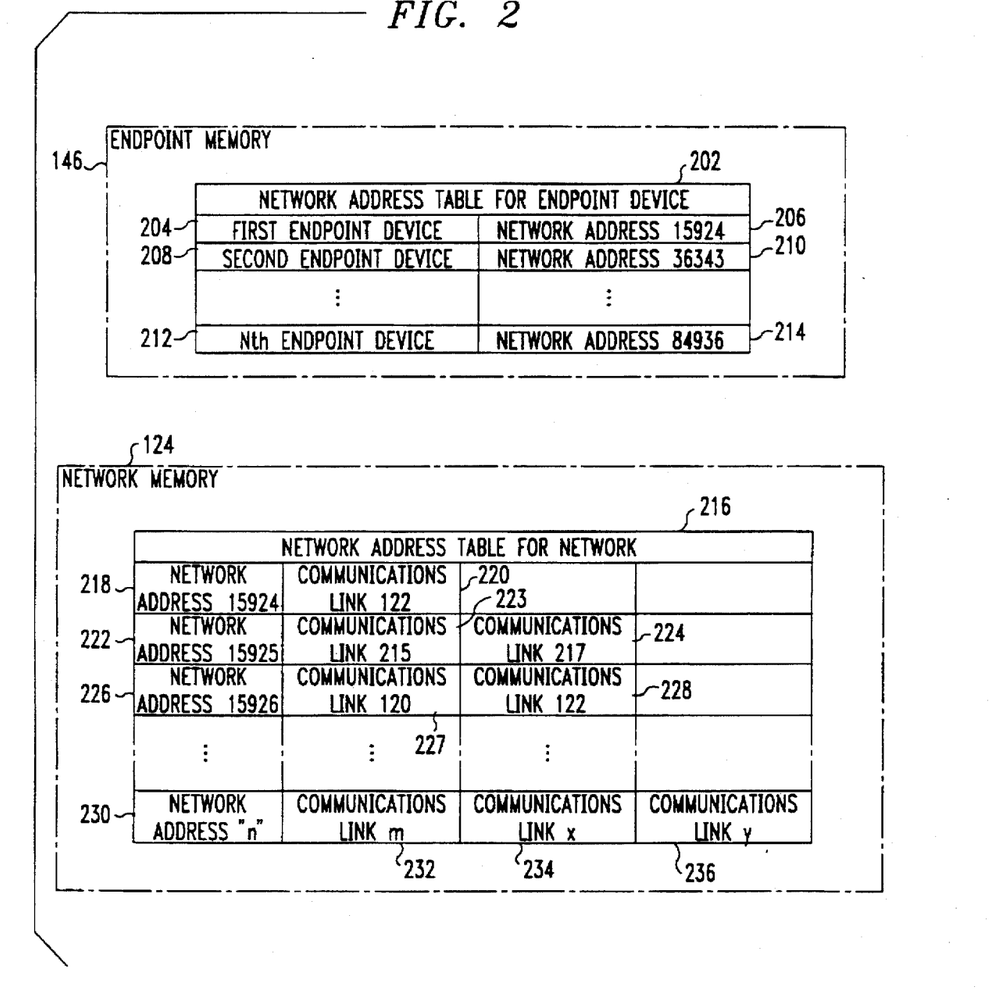
FIG. 2 sets forth the data structures utilized by the multimedia conferencing system of FIG. 1.

FIG. 2 sets forth the data structures utilized by the endpoint devices 104, 106, network 108, and MMS 102 of FIG. 1. Endpoint memory 146 is organized to contain one or more network address tables for endpoint device 202, and endpoint memory 148 is also organized in this manner. Each network address table for endpoint device 202 associates a given conference identifier with a corresponding network address. For example, conference identifier 204 specifies Conferee "A", and associates Conferee "A" with network address 15924 stored in network address field 206. Conference identifier 208 specifies Conferee "B", and associates Conferee "B" with network address 36343 stored in network address field 210. Conference identifier 212 associates Conferee "n" with network address 84936 stored in field 214.

Network memory 124 is organized to include one or more network address tables for network 216. Each of these network address tables for network 216 associates a given network address with a corresponding list of one or more communications links. For example, network address 15924 stored in field 218 is associated with communications link 122 stored in field 220. Network address 15925 stored in field 222 is associated with communications links 215 and 217, stored in fields 223 and 224, respectively. Network address 15926 (field 226) is associated with communications links 120 and 122 (fields 227 and 228, respectively). Network address "n" (field 230) is associated with three communications links, referred to as "m", "x", and "y", and stored in fields 232, 234, and 236, respectively.

Figure 3:
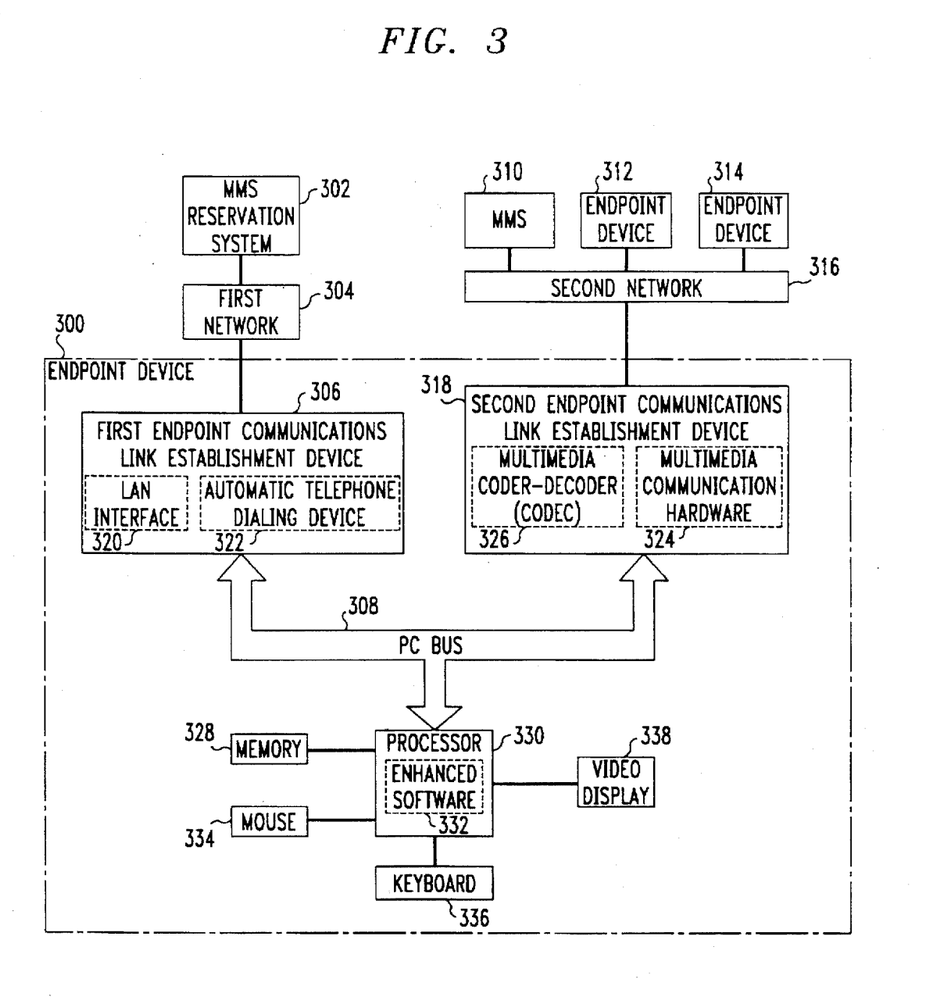
FIG. 3 is a hardware block diagram setting forth the hardware configuration for a preferred embodiment of an endpoint device which includes a personal computer.

FIG. 3 sets forth a hardware configuration for an exemplary endpoint device 300 constructed according to a preferred embodiment disclosed herein. In this example, endpoint device 300 is coupled to a first network 304 and a second network 316. First network 304 provides a connection to an MMS reservation system 302, and second network 316 provides connections to an MMS 310, endpoint device 312, and endpoint device 314. In the configuration of FIG. 1, endpoint device 300 may be incorporated into the multimedia conferencing system as endpoint device 104 and/or endpoint device 106. Alternatively, other types of endpoint devices may be used for endpoint devices 104, 106.

Endpoint device 300 is based upon a personal computer. A first endpoint communications link establishment device 306 includes a LAN interface 320 and/or an automatic telephone dialing device 322. The first network 304 interfaces with the first endpoint communications link establishment device 306. A second endpoint communications link establishment device 318 includes a multimedia coder/decoder (CODEC) 326, and/or multimedia communication hardware 324. The second endpoint communications link establishment means 318 interfaces with the second network 316.

First and second endpoint communications link establishment devices 306, 318 are coupled to a standard PC bus 308 of a type well-known to those skilled in the art, such as an ISA bus. PC bus 308 interfaces with a processor 330, which may be a standard microprocessor known to those skilled in the art. The processor 330 is coupled to a memory 328. Enhanced software 332 is stored in the processor 330 and/or the memory 328. This enhanced software 332 implements the procedures set forth in FIGS. 7, 8, and 9, to be described in greater detail hereinafter.

Processor 330 interfaces with a plurality of peripheral devices such as a mouse 334, a keyboard 336 and a video display 338. Mouse 334, keyboard 336, and video display 338 are all standard items known to those skilled in the art. In this manner, endpoint device 300 is equipped to communicate multimedia information such as data and video.

Although the best service is obtained when all endpoint devices 104, 106 participating in the conference are "enhanced," endpoint devices which present a seamless interface to the user, enhanced operation in accordance with a preferred embodiment disclosed herein may be obtained if only one enhanced endpoint device 104 (i.e., an initiating endpoint device for initiating a conference or a convenor endpoint device for adding an additional endpoint device to the conference) are present. The hardware structure of such an enhanced endpoint device was described in conjunction with FIGS. 1 and 3 (above). These enhanced endpoint devices are enhanced in the sense that they are adapted to implement the series of steps set forth in FIGS. 6 and 8, to be described hereinafter.

Figure 4:
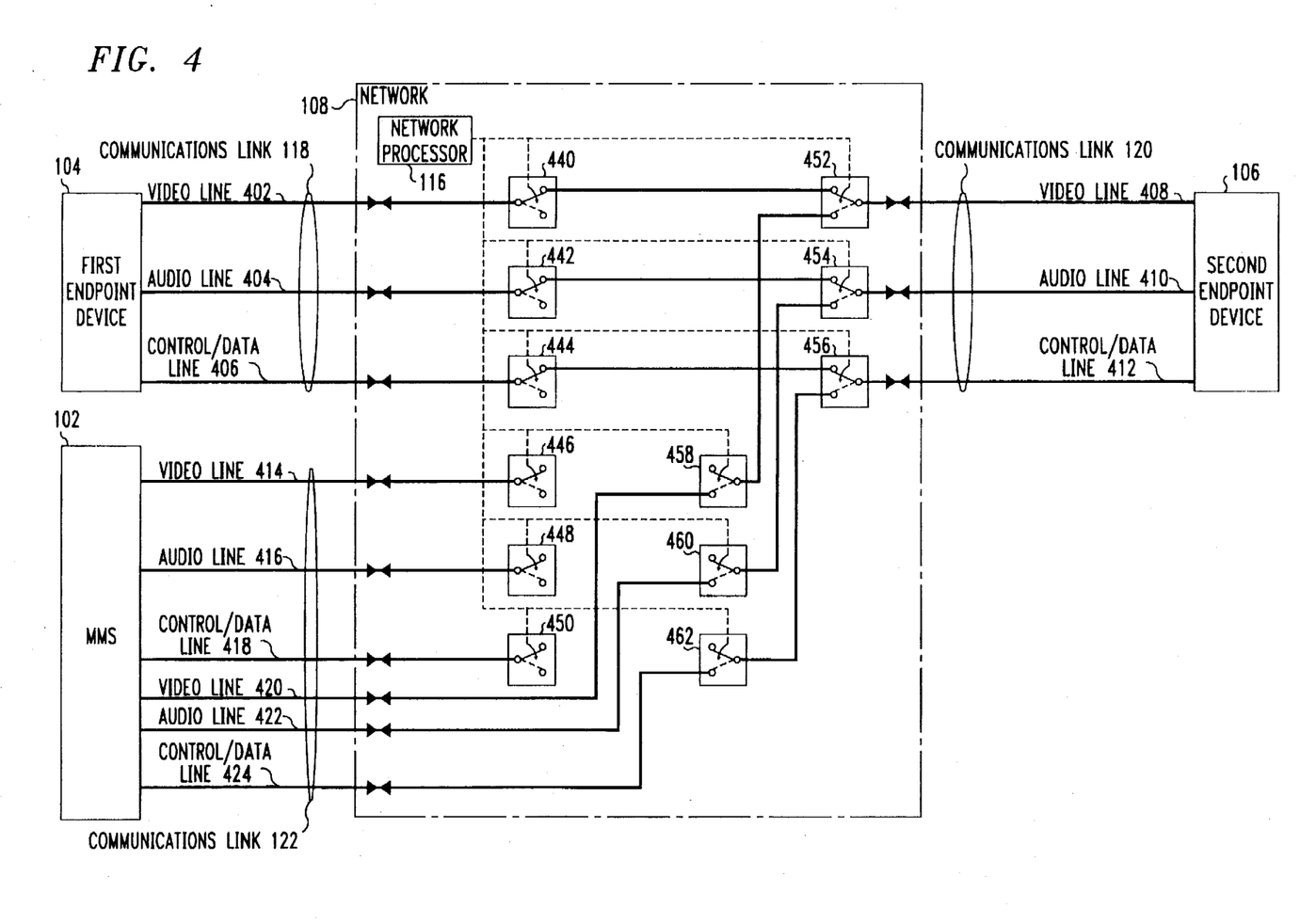
FIG. 4 is a hardware block diagram setting forth the system topology of network 108 in the context of multimedia signals.

FIG. 4 is a hardware block diagram setting forth the system topology of network 108 (FIG. 1) in the context of multimedia signals such as audio, video, and data. Many existing networks 108 (FIG. 1) were developed for the purpose of switching voice and/or data, and are not especially well-suited to the wide bandwidth requirements of video. Examples of such networks include conventional central switching office equipment and some computer local area networks (LANs). Moreover, certain prior art networks, such as the central switching office example discussed above, were developed to handle point-to-point communications to and from a first party and a second party.

Difficulties arise when conventional networks are called upon to implement a multipoint communications connection between three or more parties, i.e., between three or more endpoint devices. Difficulties also arise with respect to the implementation of video communications links. Accordingly, special hardware and software are required to implement video communications over a network, and special hardware and software are also required to implement multipoint communications. The MMS 102 (FIG. 1) was developed for the purpose of providing multipoint communications in a multimedia environment (including video), where the parties requiring communication services are restricted to using endpoint devices connected to conventional networks 108. The MMS 102 is geared to utilizing network 108 such that network 108 conveys multimedia information to the MMS 102 from selected endpoint devices where MMS 102 performs a "bridging" function in a manner consistent with the needs of communication services recipients.

FIG. 4 demonstrates the manner in which a conventional network 108 may be adapted for multimedia conferencing applications through the use of an MMS 102. In the example of FIG. 4, network 108 is a conventional central switching office at a local telephone company. The network 108 was designed for the purpose of carrying voice communications over point-to-point links and includes a plurality of communication pathways such as lines 402–424 for this purpose. However, these lines 402–424 may be grouped together to carry information, such as video and data, in addition to voice. Although network 108 is described as a central switching office, this is done for illustrative purposes, it being understood that the network could be another type of existing network, such as a LAN.

First endpoint device 104 is connected to network 108 via communications link 118, which contains a video line 402, an audio line 404, and a control/data link 406. (In actuality, video line 402 could represent several conventional wire pairs, whereas audio line 404 may only include one conventional wire pair.) Video line 402 connects to switch 440 in network 108. Audio line 404 connects to switch 442, and control/data line 406 connects to switch 444.

Second endpoint device 106 is connected to network 108 via communications link 120, which contains video line 408, audio link 410, and control/data line 412. Video line 408 connects to switch 452, audio line 410 connects to switch 454, and control/data line connects to switch 456.

Signal routing device 129 of MMS 102 is connected to network 108 via communications link 122. This communications link 122 includes a plurality of video lines 414, 420, a plurality of audio lines 416, 422, and a plurality of control/data lines 418, 424. Video line 414 connects to switch 446 in network 108, audio line 416 connects to switch 448, control/data line 418 connects to switch 450, video line 420 connects to switch 458, audio line 422 connects to switch 460, and control/data line 424 connects to switch 462.

The switches 440–462 of network 108 are under the control of network processor 116, which may be a conventional microprocessor device known to those skilled in the art. The network processor 116 controls the operation of each switch 440–462, and selectively connects and/or disconnects a given switch (i.e., switch 440) to/from another switch (i.e., switch 452). The circuit topology of network 108 with respect to switches 440–462 is shown for illustrative purposes only, it being understood that network 108 may include any switching topology equipped to selectively connect and/or disconnect a plurality of communication links.

MMS Reservation System

Figure 5:
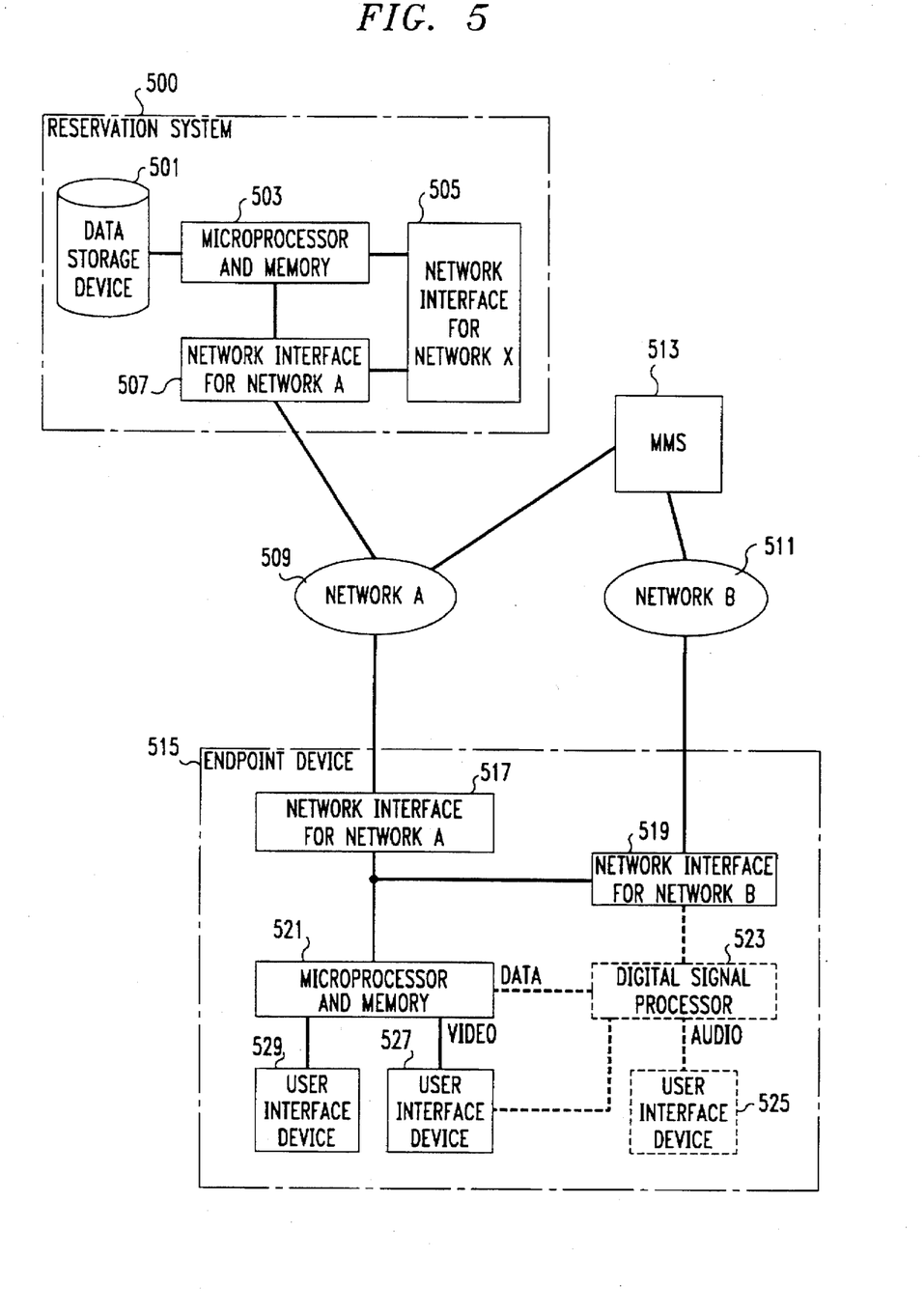
FIG. 5 is a hardware block diagram showing a multimedia conferencing system which utilizes a reservation system for bridging multimedia signals.

With reference to FIG. 5, the MMS reservation system 500 is a computer-based device that communicates over a communications network, such as network A 509, to MMS 513 and to endpoint device 515. The reservation system 500 includes one or more network interfaces, such as network interface for network A 507, and network interface for network X 505. In addition to providing a communications protocol interface between network A 509 and reservation system 500, the network interface for network A 507 is responsive to endpoint device 515 requests for MMS 102 resources. Reservation system 500 also includes a microprocessor and memory 503 which issues requests for required information to the endpoint devices, confirms the availability of MMS 102 resources by checking against a database of previous MMS reservations, and responds to endpoint device 515 with access codes and network identifiers as needed stored in a data storage device 501.

Note that MMS 513 may be coupled to a plurality of networks, including network A 509 and network B 511. A & B may actually be the same networks, or they may be different networks. Endpoint device 515 may be equipped to communicate over a plurality of networks via a network interface for network A 517, and a network interface for network B 519. The endpoint device includes a microprocessor and memory 521, and a digital signal processor (DSP) 523 for terminating various multimedia communications protocols. A plurality of user interface devices 525, 527, 529 are provided, and are coupled to microprocessor and memory 521 or DSP 523 (optional). User interface devices 525, 527, 529 may include, for example, a mouse or tablet, a touch-sensitive screen, a CRT, or LCD display, or the like. Bellcore GR-1337-CORE describes an illustrative example of a reservation system 500. Examples of such systems include the AT&T CRS (Conference Reservation System), and CONVENE.

Figure 6:
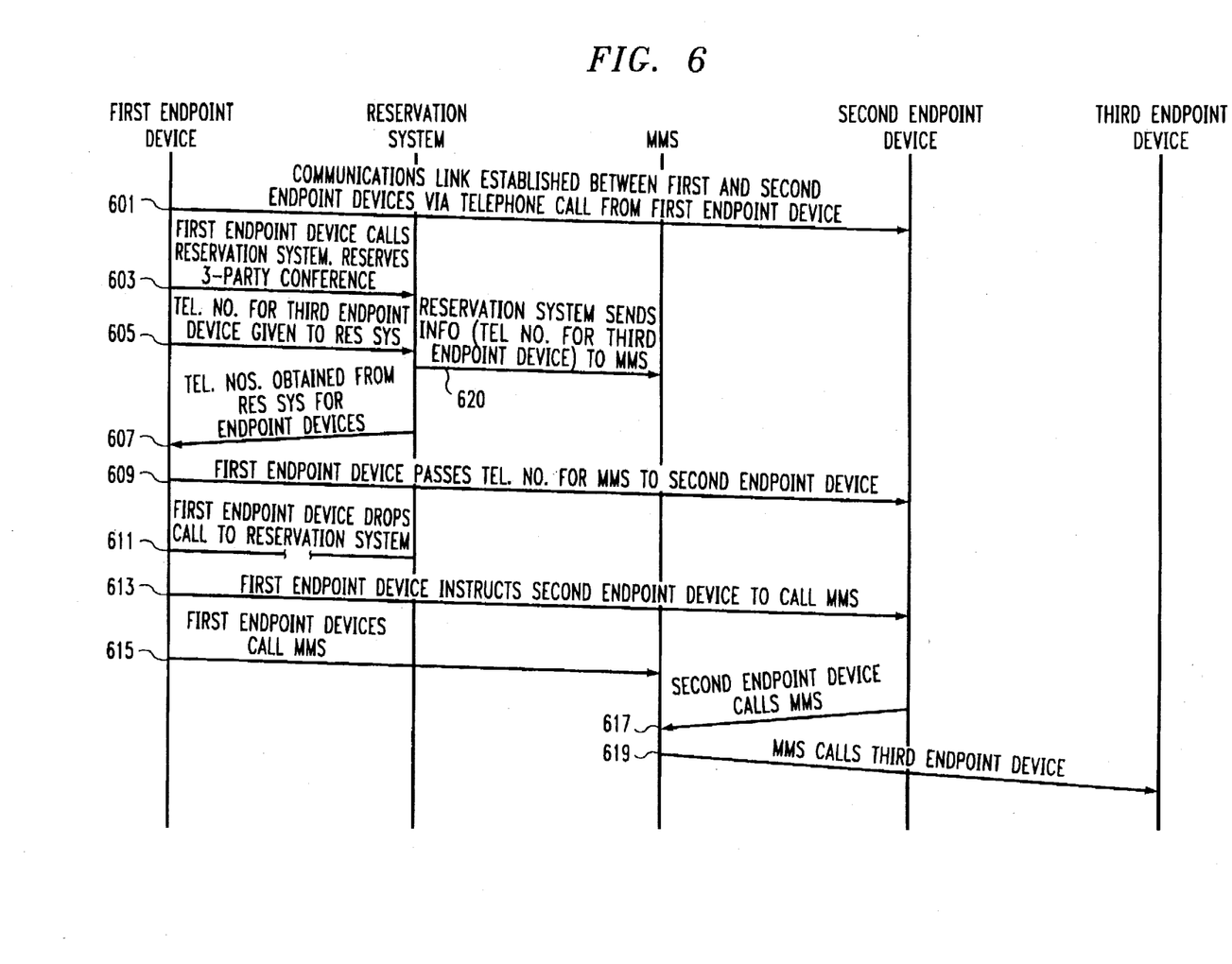
FIG. 6 is a flowchart setting forth a procedure for implementing multimedia conferences according to a preferred embodiment disclosed herein.

The apparatus and method of the present invention involves the use of an existing network 108, enhanced endpoint devices 104, 106, and a Multimedia Server (MMS) 102 (FIG. 1). The invention provides improved multipoint call setup and seamless transition from a point-to-point call to a multipoint conference, as will be described with reference to FIGS. 6–8. The flowcharts of FIGS. 6 and 8 are based upon the utilization of a system such as that of FIG. 1, wherein a first party, a second party, and a third party are all equipped with endpoint devices as shown in FIG. 1. The parties have access through the network 108 to each other, and also are able to access a Multimedia Server (MMS) and an MMS reservation system.

Several novel methods are disclosed for implementing a multimedia conference, as will be described in greater detail in conjunction with FIGS. 6 and 8. To summarize, in connection with a first embodiment, a conference is initiated when the communications link establishment device of a first endpoint device establishes a point-to-point communications link with a second endpoint device over the network. Next, the user of the first or second endpoint device selects an option of setting up a multipoint, multimedia conference by entering a request including the network address of a third party into the user interface device of the respective endpoint device. The request is forwarded to the endpoint device endpoint processor which commands the endpoint device communications link establishment device to establish a communications link with the reservation system. The endpoint device endpoint processor then issues an information request to the reservation system for two network addresses (and/or telephone number) and a conference identification number uniquely specifying a given multimedia conference, while conveying the network address of a third party to be added. The reservation system relays this information request to the MMS. The MMS provides the reservation system with the conference identification number and the network address(es) (and/or telephone number). The conference identification number and network address(es) (and/or telephone number) are downloaded from the reservation system processor into the requesting endpoint device endpoint processor. The conference identification number and network address (and/or telephone number) are stored in endpoint memory, and are also downloaded to the other endpoint device endpoint processor. The point-to-point communications link between the first and second endpoint devices is disconnected. The first and second endpoint device endpoint communications link establishment devices each establish a communications link with the MMS at the network address (and/or telephone number) downloaded into respective endpoint device memories. The MMS as previously instructed by the reservation system establishes a communications link with the third endpoint device, thereby establishing a multipoint, multimedia conference.

Multimedia conferences established according to various preferred embodiments disclosed herein are perceived by endpoint device users to be procedurally continuous, such that, once a communications link is established with a given endpoint device, this communications link is perceived to be substantially continuous until such time as the multimedia conference has been fully implemented. In this manner, multimedia conferences are provided which are substantially procedurally continuous as perceived by system users.

Refer now to FIG. 6, which sets forth a flowchart for implementing a multimedia conference according to a preferred embodiment described herein. The program commences at line 601, where a communications link is established between first and second endpoint devices via a telephone call placed from the first to the second endpoint device. This telephone call is placed using the endpoint communications link establishment device 306 of first endpoint device 300 (FIG. 3). The first endpoint device is coupled to network 304, which may be a conventional telephone network, and the telephone number may be stored in endpoint memory 328.

Next, at line 603, the first endpoint device 300 establishes a communications link with (i.e., calls) the reservation system (302, FIG. 3) to reserve a three-party conference. At line 605, the telephone number (and/or network address) of a third endpoint device is sent from the first endpoint device 300 to the reservation system 302. At line 620, the reservation system sends the reservation to the MMS including the network address of the third party and appropriate instructions requesting dial-out treatment for that party. At line 607, the reservation system 302 sends the first endpoint device 300 the network address for use by the endpoint. The first endpoint device 300 sends the network address for the MMS and the conference 10 to the second endpoint device (line 609), and the first endpoint device 300 breaks the communications link between itself and the reservation system 302 (line 611). The first endpoint device 300 instructs the second endpoint device to establish a multimedia communications link with (i.e., calls) the MMS (line 613) and then drops the call established in line 601. Then, the first endpoint device establishes a communications link with (i.e., calls) the MMS (line 815). At line 617, the second endpoint device calls the MMS, and at line 619, the MMS calls the third endpoint device.

Figure 7:
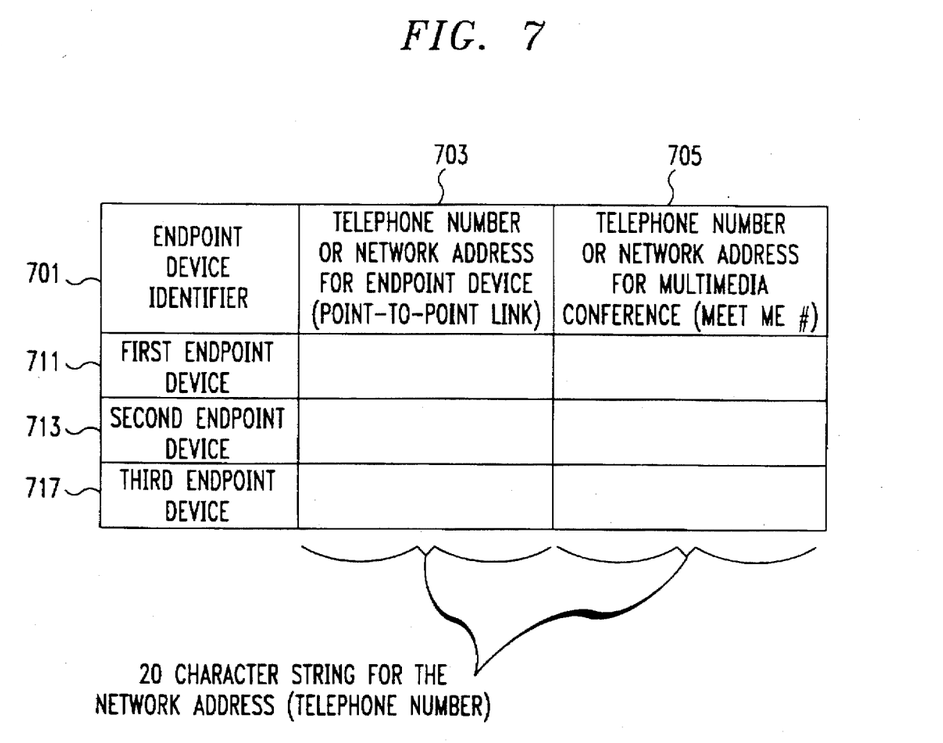
FIG. 7 sets forth the data structures utilized by endpoint memory.
Figure 8:
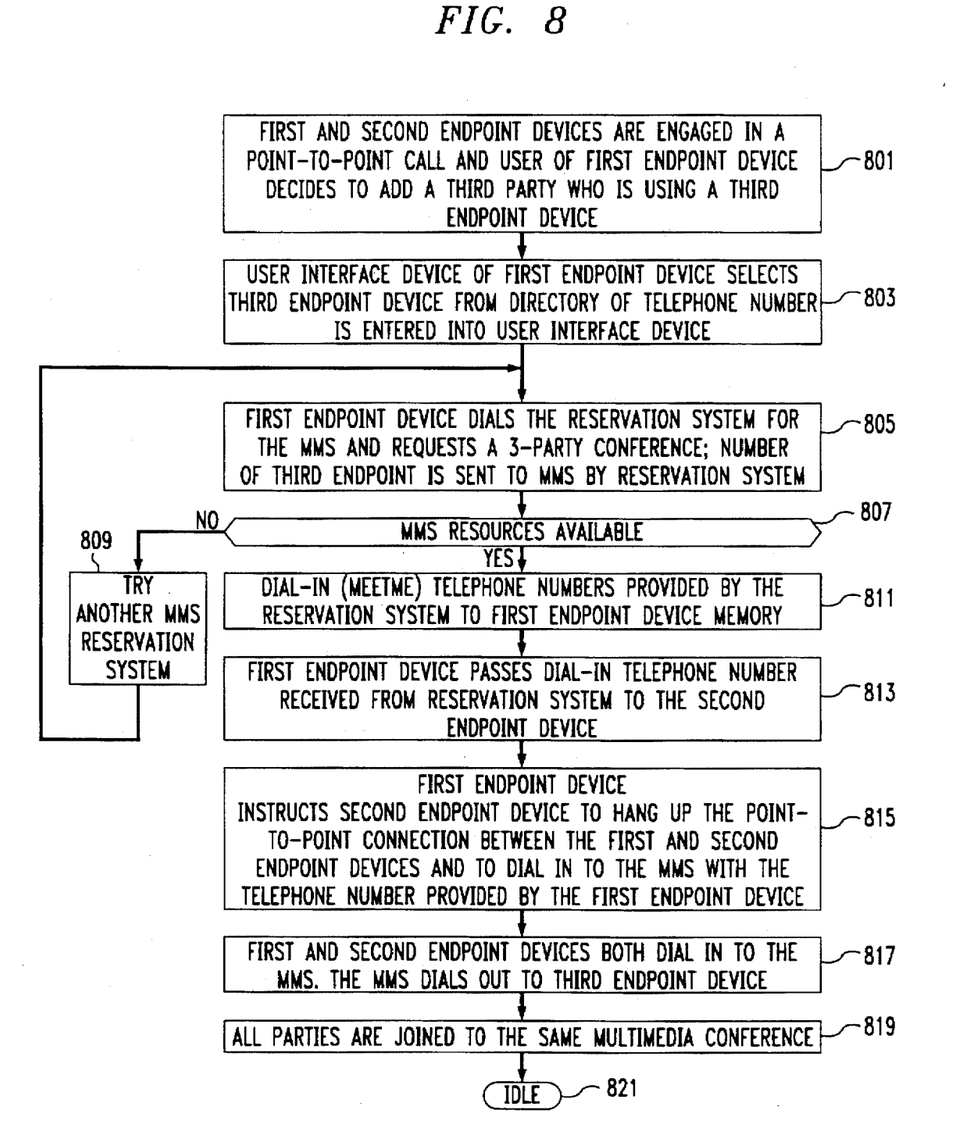
FIG. 8 is a flowchart setting forth a method for implementing multipoint, multimedia conferences.

FIG. 7 sets forth the data structures utilized by endpoint memory 146 (FIG. 1). The data structures are organized into a table. A first table column 701 sets forth an endpoint device identifier which uniquely specifies a given endpoint device. A second table column 703 is used to store the telephone numbers and/or network addresses for endpoint devices for the purpose of establishing a point-to-point communications link while a conference is being arranged. A third table column 705 stores the telephone numbers and/or network addresses which are utilized to establish multimedia (i.e., video, audio, and data) multipoint (>2 endpoint devices) conferences. A fourth column 707 stores the current state of a communications link. Current states include ringing, busy, connected, reconnecting, reordering, no communication resources are available, and the like.

The table of FIG. 7 is also organized into rows. A first row 711 includes information pertaining to a first endpoint device. This information includes the information stored in the table columns described above. A second row 713 includes information pertaining to a second endpoint device, and a third row 717 includes information pertaining to a third endpoint device. Columns 703 and 705 may contain a 20-character suing for the network address and/or telephone number.

In the case where endpoint device 104 is PC-based, the endpoint user may place a call by selecting a "Call" menu item from a main menu bar on the video window in a windows-based environment. This would bring up a dialog box that presents a directory of parties to call in a scrolling list box. The user then selects a party to call (Party 1) (corresponding to a particular endpoint device) and then selects a "Call" command button. The user may choose to call another multimedia endpoint or the MMS (also known as the MCU-Multipoint Control Unit). If the user chooses to call the MMS, prior-art procedures may be followed for connecting a multimedia endpoint to an MMS. After connecting to the MMS, the user may choose to call another party by selecting an "Add Party" item from the main menu. A dialog box would pop up and the user can select a party from the directory or enter the telephone number(s) directly into the PC keyboard and/or via the endpoint's menus and dialog boxes.

The flowchart of FIG. 8 commences at block 801, where the first and second endpoint devices are engaged in a point-to-point call and the user of the first endpoint device decides to add a third party who is using a third endpoint device.

Next, at block 803, the user interface device of the first endpoint device selects the third endpoint device from a directory of telephone numbers which has previously been entered into the user interface device. This directory of telephone numbers is customized for the user or users of a specific endpoint device. It is customized in the sense that each user can enter one or more telephone numbers and/or network addresses into the user interface device, and these telephone numbers/network addresses will be stored in a directory. Each user may be provided with their own directory on a given endpoint device.

Advancing now to block 805, the first endpoint device dials the reservation system for the MMS and requests a 3-party conference, passing the number of the third endpoint to the reservation system.

At block 807, a test is performed by the reservation system to ascertain whether or not sufficient MMS hardware and software are available and currently unused, such that the MMS is capable of handling the requested multimedia conference. If not, the program advances to block 809, where the endpoint device attempts to access another reservation system if another is known to the endpoint. From block 809, the program loops back to block 805.

The affirmative branch from block 807 leads to block 811, where one or more telephone numbers are downloaded from the reservation system data storage device to the first endpoint device memory. The numbers to be downloaded are selected by the reservation system processor based upon information sent from the endpoint device to the reservation system in block 805. This information consists of a request for a multiparty conference among a plurality of specified endpoint devices, telephone numbers and/or network addresses.

At block 813, the first endpoint device passes the dial-in telephone number received from the reservation system at block 811 to the second endpoint device.

The first endpoint device instructs the second endpoint device to hang up the point-to-point connection between the first and second endpoint devices and to dial in to the MMS with the telephone number provided by the first endpoint device. The first and second endpoint devices both dial in to the MMS and the MMS dials out to third endpoint device (block 817). All parties, i.e., all endpoint devices are now joined to the same multimedia conference (block 819). After the conference has been completed, the program enters an idle mode (block 821). This method extends to greater than three parties via a re-connection to the reservation system, the use of a similar procedure.

Therefore, the description here covers the preferred method of implementing multimedia conferences, but it is recognized that other methods are possible.

We claim:

1. An enhanced endpoint device for use in a multimedia conferencing system having a multimedia server and a plurality of endpoint devices including a second endpoint device and a third endpoint device, the enhanced endpoint device comprising:

point-to-point communications link establishment means adapted for establishing a point-to-point communication link between the enhanced endpoint device and the second endpoint device;

a data transceiver for transmitting and receiving electronic data signals;

processing means comprising a microprocessor, the processing means being coupled to the data transceiver and to the communications link establishment means;

multipoint communications link establishment means, coupled to the multimedia server, for establishing a multipoint communications link between the enhanced endpoint device, the second endpoint device, and the third endpoint device, such that the processing means after initial action by a user automatically transforms the point-to-point communications link into a multipoint communications link as a substantially continuous operation in the perception of an enhanced endpoint device user, wherein the third endpoint device is added to a preexisting conference between the enhanced and second endpoint devices, and wherein, from a participant's viewpoint, the preexisting conference is not substantially interrupted at the enhanced endpoint device, thereby providing a seamless conference as perceived by participants at the enhanced endpoint device;

memory means coupled to the processing means; and a user interface coupled to the processing means for accepting user input and converting the user input into electronic data signals.

2. A multimedia conferencing system comprising a first enhanced endpoint device and a second enhanced endpoint device, the first and second enhanced endpoint devices each adapted for coupling to a multimedia server and a third endpoint device, the first and second enhanced endpoint devices each comprising:

point-to-point communications link establishment means adapted for establishing a point-to-point communications link between the enhanced endpoint device and another endpoint device;

a data transceiver for transmitting and receiving electronic data signals;

processing means for comprising a microprocessor, the processing means being coupled to the data transceiver and to the communications link establishment means;

multipoint communications link establishment means, adapted for coupling to the multimedia server, for establishing a multipoint communications link between the first enhanced endpoint device, the second enhanced endpoint device, and the third endpoint device, such that the processing means after initial action by a user automatically transforms the point-to-point communications link into a multipoint communications link as a substantially continuous operation in the perception of the user wherein the third endpoint device is added to a preexisting conference between the first and second enhanced endpoint devices, and wherein, from a participant's viewpoint, the preexisting conference between the first and second enhanced endpoint devices is not substantially interrupted, thereby providing a seamless conference as perceived by participants between the first and second enhanced endpoint devices;

memory means coupled to the processing means; and a user interface coupled to the processing means for accepting user input and converting the user input into electronic data signals.

3. A method of establishing a multimedia conference between a multimedia server and a plurality of endpoint devices including an enhanced endpoint device, a second endpoint device, and a third endpoint device, the method including the steps of:

(a) the enhanced device establishing a point-to-point communications link between the enhanced endpoint device and the second endpoint device; and (b) the enhanced endpoint device establishing a multipoint communications link between the multimedia server, the enhanced endpoint device, the second endpoint device, and a third endpoint device, such that the point-to-point communications link after initial action by a user is automatically transformed into a multipoint communications link as a substantially continuous operation in the perception of an enhanced endpoint device user, wherein the third endpoint device is added to a preexisting conference between the enhanced and second endpoint devices, and wherein, from a participant's viewpoint, the preexisting conference is not substantially interrupted at the enhanced endpoint device, thereby providing a seamless conference as perceived by participants at the enhanced endpoint device.

4. A method of establishing a multimedia conference between a multimedia server and a plurality of endpoint devices including a first enhanced endpoint device, a second enhanced endpoint device, and a third endpoint device, the method including the steps of:

(a) the first enhanced endpoint device establishing a point-to-point communications link between the first enhanced endpoint device and the second enhanced endpoint device; and (b) the first enhanced endpoint device establishing a multipoint communications link between the multimedia server, the first enhanced endpoint device, the second enhanced endpoint device, and the third endpoint device, such that the point-to-point communications link is, after initial action by a user, automatically transformed into a multipoint communications link as a substantially continuous operation in the perception of an enhanced endpoint device user, wherein the third endpoint device is added to a preexisting conference between the first and second enhanced endpoint devices, and wherein the preexisting conference between the first and second enhanced endpoint devices is not substantially interrupted from a viewpoint of participants, thereby providing a seamless conference as perceived by the participants between the first and second enhanced endpoint devices.

5. A method of establishing a multimedia conference between a multimedia server and a plurality of endpoint devices including: (i) a first enhanced endpoint device having a memory adapted to store one or more telephone numbers, each telephone number corresponding to a respective endpoint device, and a user interface coupled to the memory for selecting a telephone number stored in the memory, (ii) a second enhanced endpoint device, and (iii) a third endpoint device; the method including the steps of:

(a) the first enhanced endpoint device establishing a point-to-point communications link between the first enhanced endpoint device and the second enhanced endpoint device;

(b) the user interface of the first enhanced endpoint device selecting a telephone number corresponding to the third endpoint device;

(c) the first enhanced endpoint device establishing a communications link with the multimedia server;

(d) the first enhanced endpoint device downloading a telephone number, network address, and/or LAN specification corresponding to the third endpoint device to the multimedia server;

(e) in response to step (d), the multimedia server downloading a dial-in telephone number to the first enhanced endpoint device;

(f) the first enhanced endpoint device downloading the dial-in telephone number to the second enhanced endpoint device;

(g) the first enhanced endpoint device instructing the second enhanced endpoint device to terminate the point-to-point communications link, and instructing the second enhanced endpoint device to dial the dial-in number downloaded by the multimedia server;

(h) the first enhanced endpoint device and the second enhanced endpoint device each dialing the dial-in number, thereby establishing a multimedia communications link between the first enhanced endpoint device, the second enhanced endpoint device, and the multimedia server; and (i) the multimedia server dialing the third endpoint device, thereby establishing a multimedia, multipoint communications link between the first enhanced endpoint device, the second enhanced endpoint device, and the third endpoint device;

wherein steps (c)–(i) are performed as a substantially continuous operation in the perception of an enhanced endpoint device user, such that the third endpoint device is added to a preexisting conference between the first and second enhanced endpoint devices, and such that, from a participant's viewpoint, the preexisting conference between the first and second enhanced endpoint devices is not substantially interrupted, thereby providing a seamless conference, as perceived by participants, between the first and second enhanced endpoint devices.

6. A method of establishing a multimedia conference between a multimedia server and a plurality of endpoint devices including: (i) a first, enhanced endpoint device having a memory adapted to store one or more telephone numbers, each telephone number corresponding to a respective endpoint device, and a user interface coupled to the memory for selecting a telephone number stored in the memory, (ii) a second nonenhanced endpoint device, and (iii) a third endpoint device; the method including the steps of:

(a) the first endpoint device establishing a point-to-point communications link between the first endpoint device and the second endpoint device, the point-to-point communications link including a voice channel;

(b) the user interface of the first endpoint device selecting a telephone number corresponding to the third endpoint device;

(c) the first endpoint device establishing a communications link with the multimedia server;

(d) the first endpoint device downloading a telephone number, network address, and/or LAN specification corresponding to the third endpoint device to the multimedia server;

(e) in response to step (d), the multimedia server downloading a dial-in telephone number to the first endpoint device;

(f) the first endpoint device providing the dial-in telephone number to the second endpoint device over the voice channel;

(g) the first endpoint device, over the voice channel, instructing the second endpoint device to terminate the point-to-point communications link, and instructing the second endpoint device, over the voice channel, to dial the dial-in number;

(h) the first endpoint device and the second endpoint device each dialing the dial-in number, thereby establishing a multimedia communications link between the first endpoint device, the second enhanced endpoint device, and the multimedia server; and (i) the multimedia server dialing the third endpoint device, thereby establishing a multimedia, multipoint communications link between the first endpoint device, the second endpoint device, and the third endpoint device;

wherein steps (c)–(i) are performed by the first enhanced endpoint device and the multimedia server as a substantially continuous operation in the perception of an enhanced endpoint device user, such that the third endpoint device is added to a preexisting conference occurring between the first and second endpoint devices, and such that, from a participant's viewpoint, the preexisting conference is not substantially interrupted at the first endpoint device, thereby providing a seamless conference, as perceived by participants, at the first endpoint device.

* * * * *